May 9, 1961 C. MacGREGOR 2,983,498
CONVEYING APPARATUS
Filed Oct. 9, 1958 5 Sheets-Sheet 4

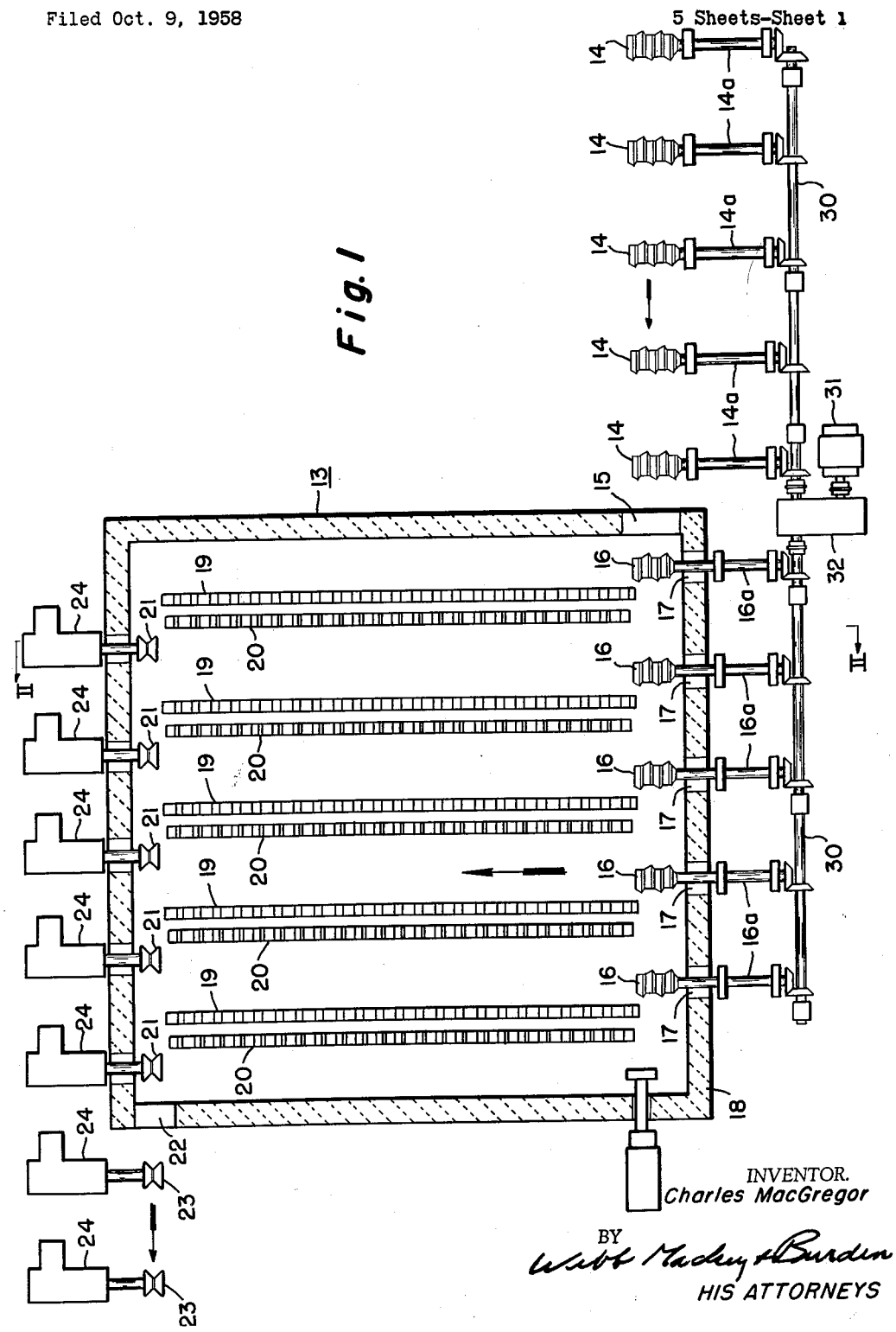

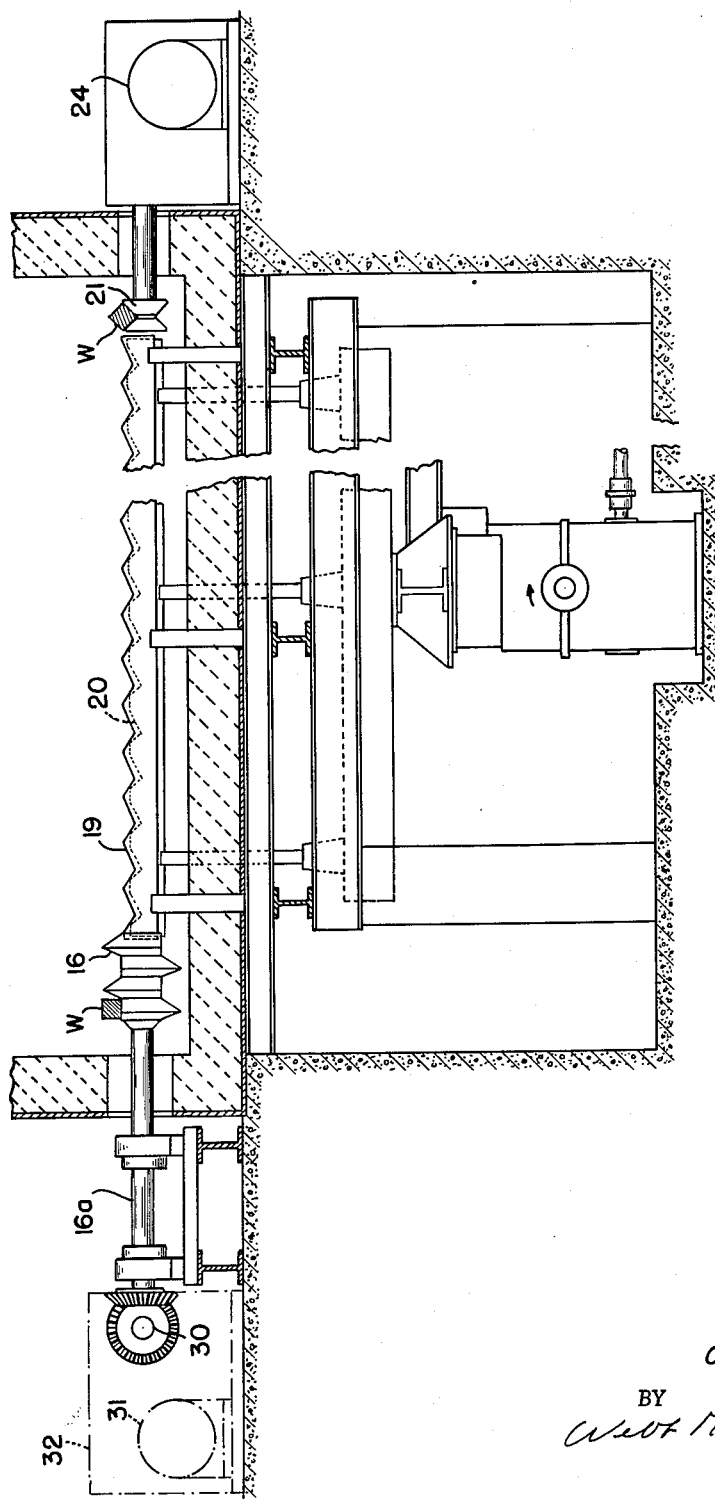

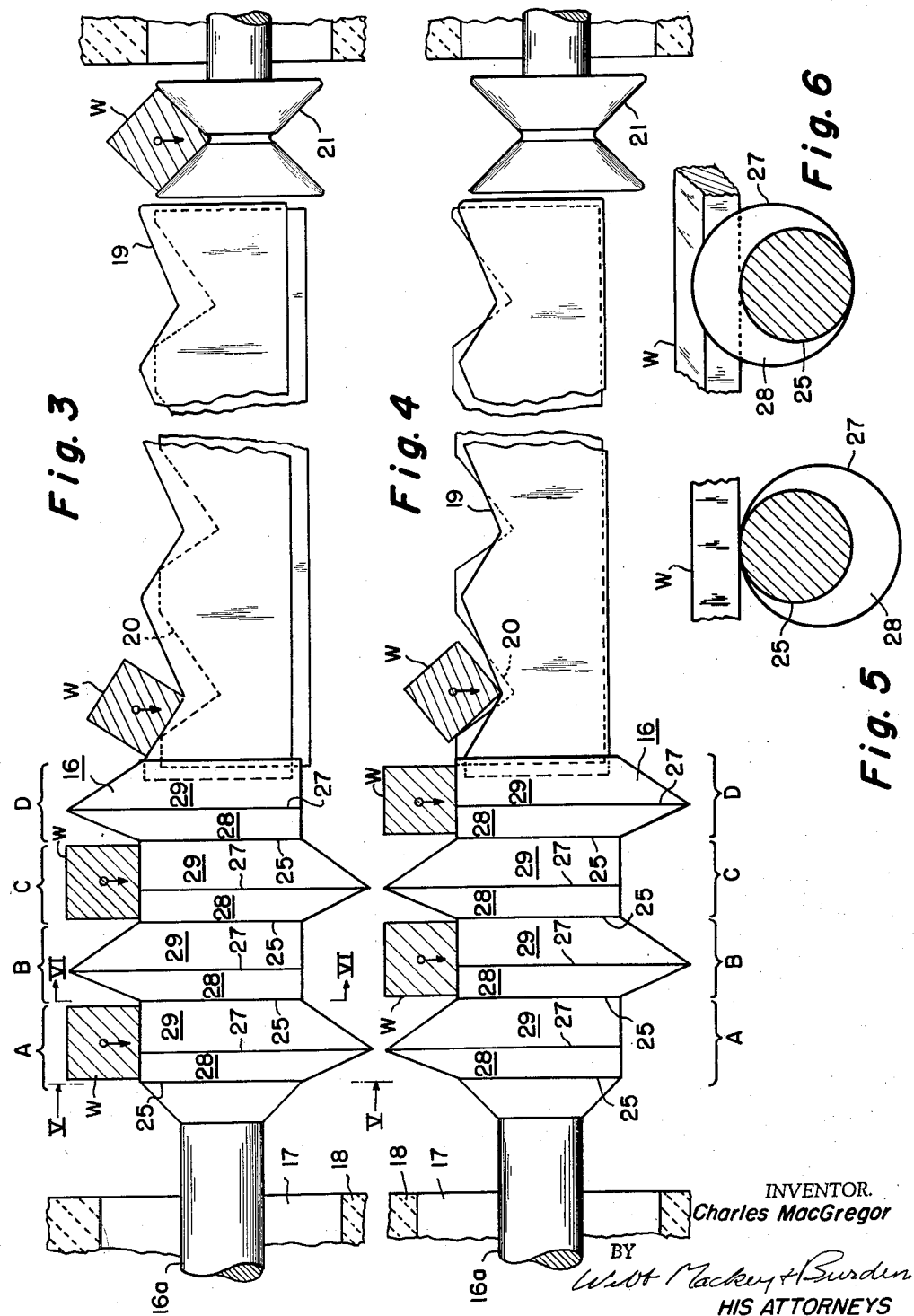

MOVEMENT OF WORKPIECES →

INVENTOR.
Charles MacGregor
BY
*Wise Mackey & Burden*
HIS ATTORNEYS

May 9, 1961 C. MacGREGOR 2,983,498
CONVEYING APPARATUS
Filed Oct. 9, 1958 5 Sheets-Sheet 5

MOVEMENT OF WORKPIECES

INVENTOR.
Charles MacGregor
BY
HIS ATTORNEYS

United States Patent Office 2,983,498
Patented May 9, 1961

2,983,498
CONVEYING APPARATUS
Charles MacGregor, Pittsburgh, Pa., assignor, by mesne assignments, to MacGregor Brothers, Pittsburgh, Pa., a partnership
Filed Oct. 9, 1958, Ser. No. 766,361
9 Claims. (Cl. 263—6)

This application relates to conveying apparatus, more particularly to a conveying table for moving workpieces to be heated through a continuous heating furnace. Such workpieces can be, for example, solid rounds, or workpieces which are rectangular, square, hexagonal, etc. in cross section.

In heating such articles for heat-treating purposes or for bringing them to proper temperatures for subsequent operations, it is very important that the workpieces be uniformly heated throughout. Aside from metallurgical requirements, various mechanical difficulties develop if the work is not heated uniformly; for example, a workpiece being heated as it moves through a furnace will warp or camber if one part is heated to a higher temperature than another part.

Heretofore, extreme difficulty has been encountered in obtaining uniform heating of such elongated workpieces, particularly when they are being heated in a continuous-type furnace in which the workpieces are fed, one at a time, into one end of a furnace, moved transversely across the furnace, and withdrawn, one at a time, from another end after being brought to the correct temperature.

It is not possible to maintain a uniform temperature throughout a continuous furnace. For example, temperatures adjacent the hearth are nearly always different from temperatures adjacent the roof. Therefore, unless the work being heated is rotated, one portion of the work will be heated more than another portion. Rotating the work has heretofore been a difficult operation and never satisfactorily done.

I have invented conveying apparatus for moving workpieces to be heated through a furnace which can readily be adapted to any conventional type of furnace, which is relatively simple in construciton, and which permits a substantially airtight furnace hearth. The speed of my conveying apparatus can readily be adjusted to control the time during which the work is heated and it can handle a wide variety of sizes and shapes.

This application is a continuation in part of my copending paplication, Serial No. 491,973, filed March 3, 1955, now U.S. Patent No. 2,858,122. That application claims methods and apparatus for conveying workpieces which are round in cross section, particularly tubes. This application is directed to methods and apparatus for conveying workpieces which may be solid rounds or which may be rectangular, square, hexagonal, etc. in cross section. A portion of such apparatus is disclosed in my application above identified.

In the accompanying drawings, I have illustrated certain presently preferred embodiments of my inventions, in which:

Figure 1 is a horizontal section through a conventional continuous furnace in which my conveying apparatus has been installed;

Figure 2 is a section along the lines II—II of Figure 1;

Figure 3 is a broken side view of the portion of my conveying apparatus which is within the furnace;

Figure 4 is a view similar to Figure 3 but showing the apparatus in a different operating position;

Figures 5 and 6 are sections along the lines V—V and VI—VI, respectively, of Figure 3, but to a reduced scale.

Figure 7:
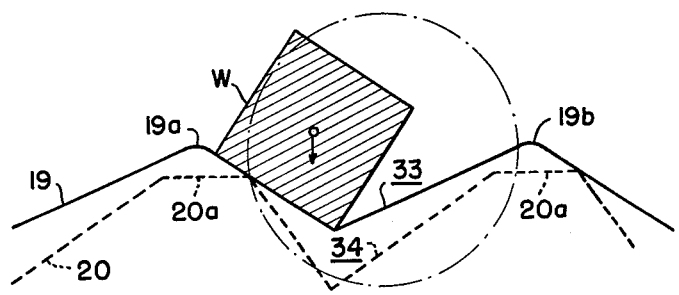
Figures 7 to 12, inclusive, are schematic diagrams showing the operation of racks which move workpieces across the furnace in a direction transverse to the axes of the workpieces.

Referring to Figure 1, workpieces, such as squares, rectangles, hexagonals, etc., are brought to a furnace 13 on rollers 14 mounted on shafts 14a and fed through an entry port 15 in the side of the furnace onto rollers 16 which are parallel to each other and are mounted on shafts 16a which extend into the furnace through openings 17 in an end wall 18 of the furnace. The rollers 14 and 16 are all parallel to each other and their axes are at substantially right angles to the path of movement of the workpieces into the furnace.

My conveying apparatus also includes two series of racks 19 and 20. These racks are movable relative to each other and, as will be hereinafter described, the workpiece supporting surfaces are contoured to form teeth between which the workpieces are supported. Preferably, the racks in the series 19 are stationary and the racks in the series 20 are movable both horizontally and vertically with respect to the stationary racks. Movement of the racks 20 relative to the racks 19 transfers the workpieces from one series of racks to the other. By this action, the workpieces are moved lengthwise of the furnace and at right angles to their axes and at the same time are rotated about their axes. The action of the racks in conveying and rotating workpieces will be later described.

Figure 2 shows how the racks 20 are moved with respect to the fixed racks 19. The racks 20 are supported by pedestals which extend up through the hearth and which move in a circular motion so as to move the racks both horizontally and vertically with respect to the racks 19. A suitable support and drive for the pedestals and the racks 20 is fully described in my copending application, Serial No. 491,973, filed March 3, 1955, now Patent No. 2,858,122.

When the workpieces reach the end of the travel on the racks, they are rolled from the stationary racks 19 onto notched rollers 21 which turn on shafts extending through openings in the opposite end wall of the furnace at right angles to the workpieces. The rotation of the rollers 21 carries the workpieces out through an exit port 22 in the side wall of the furnace onto additional rollers 23 which support the workpieces as they come out of the furnace 13.

The rollers 21 and 23 are each separately driven by motors 24. The drive for the rollers 14 and 16 will be subsequently described.

Figures 3 and 4 show the rollers 16 which carry workpieces within the furnace and which rotate the workpieces about their axes during this movement. Each of the rollers 16 is shaped to form a plurality of segments which are spaced axially along the length of the roller. In Figures 3 and 4, four such segments are shown and are marked A, B, C, and D, respectively. The periphery 25 of each segment at its axial end is circular and concentric with the axis of the roller and of the shaft 16a which supports the roller. At a point 27 between the axial ends of each segment, the periphery of the segment is also circular, but the center of this circle is offset with respect to the axis of the roller and of the shaft 16a.

As most clearly shown in Figures 5 and 6, the circles 25 and 27 along a common line parallel to the axis of the roller are the same distance from the axis of the roller. The circle 27 has a larger radius than the circle 25 and each segment thus forms two camming surfaces 28 and 29 on which the workpiece W is supported. Referring to Figures 3 to 6, inclusive, it will also be seen that the common line to which the circles 25 and 27 extend the same distance from the axis of the roller in one segment is 180° from the point where the circles 25 and 27 are the same distance from the axis of the roller in the next segment.

The rollers 14 are the same in construction as the rollers 16, in that they have a plurality of segments with workpiece supporting cam surfaces thereon. However, the workpieces should be rotated about their axes as they reach the entry port 15 of the furnace and, therefore, the rollers 14 have one more segment than the rollers 16.

A workpiece to be fed into the furnace is placed on the rollers 14 on the innermost segment of each of the rollers 14. The rollers 14 and 16 are then rotated in unison. Referring now to Figure 3, it will be seen that, as the roller turns, the cam surface 29 will gradually rise upwardly against the bottom of the workpiece W. The circle 27 is so spaced along the axis of the roller between the circles 25 that this circle will engage the bottom surface of the workpiece at a point offset from the center of gravity of the workpiece so that, as the shaft turns, the cam surface 29 on the segment A will turn the workpiece about its longitudinal axis against the cam surface 28 on the segment B. As the cam surface 29 on segment A rises up against the bottom of the workpiece, it turns the workpiece against the cam surface 28 on the segment B. However, since segments A and B are turned 180° with respect to each other, cam surface 28 on segment B is receding (vertically) as cam surface 29 is rising. Therefore, when the roller has turned 180° from the position shown in Figure 3 to the position shown in Figure 4, the workpiece W will have been rotated about its axis 90° and will rest on the segment B at the point where the peripheries 25 and 27 of segment B are the same distance radially from the axis of the roller.

It will be understood, of course, that, during rotation of the rollers 14 and 16, the workpiece W is not only being rotated about its own axis, as just described, but it is also being moved in a direction along its length into the furnace. Continued rotation of the rollers 14 and 16 advances the workpiece along its length into the furnace and also transfers the workpiece in sequence from segment B to segment C and to segment D of each roller. From the foregoing, it is apparent that the rollers 14 and 16 must be rotated in synchronism with each other. Therefore, the shafts 14a and 16a for each roller 14 and 16 are geared to a common drive shaft 30 which, in turn, is driven by a motor 31 through a gear reducer 32 (see Figure 1).

The cam surface 29 of segment D rolls the workpiece onto the stationary racks 19, as shown in Figure 4. The movable racks 20 are moved in a circle so that they move both vertically and horizontally with respect to the racks 19. As will be more fully described, this movement transfers the workpieces W from one rack to the other and moves them the length of the furnace and, at the same time, rotates them about their axes. After the workpieces have reached the last trough between two teeth on the stationary racks 19, movement of the racks 20 rolls the workpieces W onto the rollers 21, and these rollers carry the workpieces out of the furnace.

Figures 7 to 12, inclusive, show the contours of the workpiece supporting surfaces of the racks 19 and 20 and illustrates diagrammatically the action of these racks in moving workpieces along the furnace and, at the same time, rotating the workpieces about their axes. In these figures, the stationary racks 19 are shown in solid lines and the moving racks 20 are shown in dotted lines. The motion of the moving racks 20 with respect to the stationary racks 19 is shown by the circles in dash and dot lines.

From Figures 7 to 12, inclusive, it will be seen that the workpiece supporting surfaces of the racks 19 are in the form of a series of teeth which extend the length of the racks. The sides of the teeth are flat and form between each two teeth triangular-shaped troughs 33. It will also be noted from these figures that the vertex of these troughs forms an angle greater than 90 degrees and further that the vertex is closer to the first of two teeth forming a trough in the direction of movement of the workpieces across the racks.

The teeth forming the moving racks 20 likewise have flat sides and form troughs 34 between them which are triangular in section. Preferably, the vertex of each trough 34 forms an angle of 90 degrees so that the sides of the troughs between teeth will fit against the sides of a workpiece. Within limits, this angle may be greater, as is later explained. The vertex of each trough between teeth on the movable racks is also closer to the first of two teeth forming the trough in the direction of movement of the workpieces. It will be further noted that the moving racks move in a circle, the diameter of which is less than the pitch of the teeth of either series of racks. For that reason, the teeth 20a on the moving racks are truncated so that, on return movement of the moving racks, they can move under and clear the workpieces supported on the stationary racks.

The operation of the racks 19 and 20 will now be described with particular reference to Figures 7 to 12, inclusive. In these figures, the center of gravity of the workpiece W is indicated by a small circle and the direction of force of gravity on the workpiece is indicated by a short arrow extending from this circle.

Figure 8:
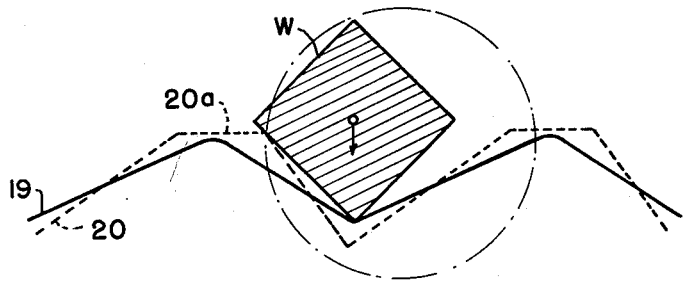
Figure 9:
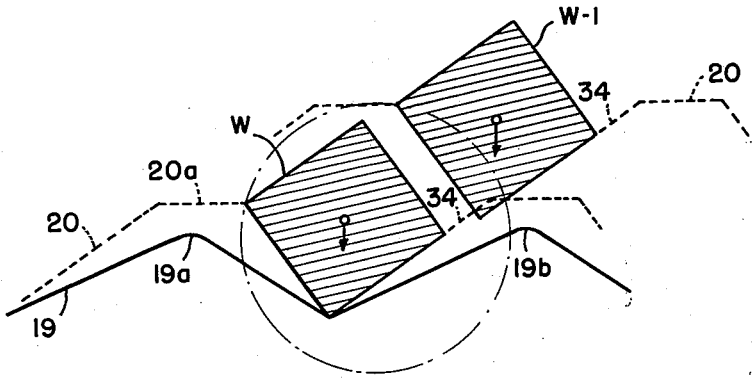

Referring now to Figure 7, a workpiece is shown as resting in a trough 33 between two teeth 19a and 19b of the stationary racks 19 and the moving racks 20 are shown in their path of movement relative to the racks 19 when they first contact a workpiece during their upward movement. As shown in Figure 7, the moving racks 20 contact the workpiece at a point offset from and to the rear (in the direction of movement of the workpieces) of the center of gravity of the workpiece. Therefore, during continued upward motion of the racks 20, the workpiece is turned about its corner which rests in the troughs in the racks 19. This rotation is shown in Figure 8. As the moving racks continue to move in their circular path of movement, they continue to rotate the workpiece in the stationary racks 19 until it reaches the position shown in Figure 9, at which position the vertices of the troughs 34 of the moving racks engage the corner of the workpiece W. The sides of the workpiece extending from this corner rest against the sides of the trough 34 because the angle formed at the vertices of the troughs is 90° and, therefore, the workpieces will not fall over against the racks 19. If such fall is not objectionable and if extra turning of the workpieces is desired at this stage, then the angle formed by the vertices of the troughs 34 can be increased. It should not, however, be increased to such an extent that, when the vertices of the troughs 34 engage the corners of the workpieces, the sides of the troughs 34 are below the sides of the troughs 33.

The moving racks 20 continue to rise with respect to the fixed racks 19, moving the workpiece from the position marked W to the position marked W–1. When the workpiece is in the position marked W–1, the moving racks 20 are at their highest point of travel relative to the stationary racks 19. On continued rotation, the racks 20 lower the workpiece W onto the crest of the teeth 19b of the stationary racks so that the teeth 19b engage the workpiece adjacent the lower corner of the workpiece at a point offset from the center of gravity of the workpiece and rearwardly of the center of gravity.

Figure 10:
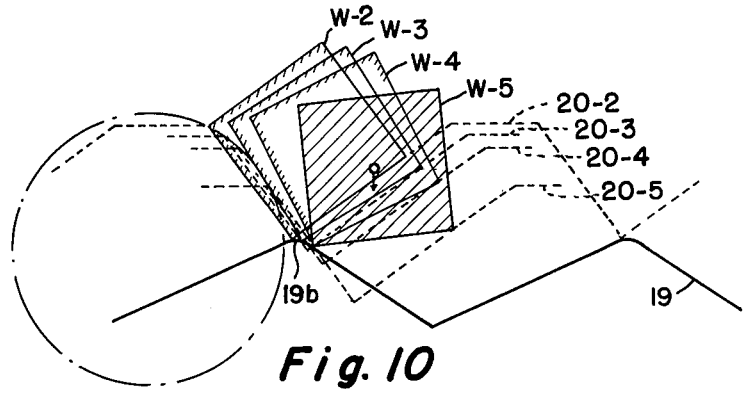

Continued movement of the racks 20 thus will allow the workpiece to turn about the tooth 19b of the fixed racks, as shown in Figure 10, in which successive positions of the workpiece are designated W–2, W–3, W–4, and W–5, and corresponding positions of the moving racks are marked 20—2, 20—3, 20—4, and 20—5.

Figure 11:
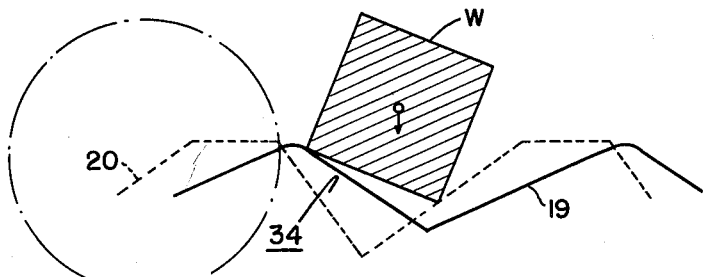
Figure 12:
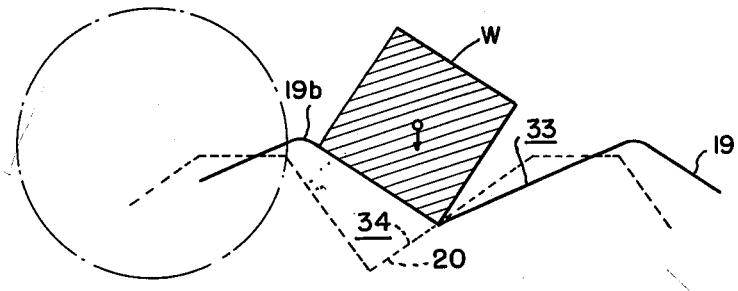

From the position 20—5 of Figure 10, the moving racks continue to move downwardly and the workpiece continues to turn, as shown in Figure 11, until the entire side of the workpiece rests against the side of the trough 33 formed by the tooth 19b and a succeeding tooth in the racks 19, as shown in Figure 12. Comparing Figure 12 with Figure 7, it will be seen that the workpiece is in the same relative position in Figure 12 as it was in Figure 7, but it has been advanced from one trough to a succeeding trough in the stationary racks 19 and also, during this transfer, it has been rotated about its axis.

My furnace conveying apparatus produces metallurgical results which have not heretofore been possible to obtain in continuous heat-treating furnaces. Because the workpieces are rotated about their own axes as they progress through the furnace, the workpieces are heated uniformly throughout and warpage of the workpieces is avoided.

My furnace conveying apparatus provides close control of the heating of workpieces so that workpieces may be made from low carbon steel having physical properties which heretofore could be obtained only by the use of high alloy steels.

While I have described certain presently preferred embodiments of my inventions, it is to be understood that they may be otherwise embodied within the scope of the appended claims.

I claim:

1. Apparatus for moving elongated, flat-sided workpieces axially and rotating the workpieces about their axes during said axial movement, comprising a series of rollers for supporting and moving the workpieces, said rollers having their axes substantially normal to the path of the axial movement of the workpieces and being spaced from each other along said path, each roller having adjoining successive segments along its axial length, the periphery of each segment at its axial ends being circular and concentric with the axis of the roller, the periphery of each segment at a point between its axial ends being eccentric to the axis of the roller, the eccentric and the concentric peripheries extending the same distance from the axis of the roller along a common line parallel to said axis, the points of greatest eccentricity of adjoining segments being spaced 180° from each other about the axis of the roller camming surfaces sloping in opposite directions from the eccentric periphery to the cylindrical peripheries, and means for rotating said rollers in synchronism with each other whereby they present the same camming surfaces to the workpieces during movement of the workpieces on the rollers.

2. Apparatus for moving elongated, flat-sided workpieces axially and rotating the workpieces about their axes during said axial movement, comprising a series of rollers for supporting and moving the workpieces, said rollers having their axes substantially normal to the axial movement of the workpieces, said rollers being spaced from each other along said path of movement, each roller having a series of adjoining pairs of camming surfaces along the axis of the roller, the two surfaces of each pair sloping in opposite directions, each pair of two surfaces meeting at a vertex forming a circle eccentric to the axis of the roller, the points of greatest eccentricity of the circles formed by adjoining pairs of surfaces being spaced 180° from each other about the axis of the roller and means for rotating said rollers in synchronism with each other whereby they present the same camming surfaces to the workpieces during movement of the workpieces on the rollers.

3. Apparatus as described in claim 1, in which the eccentric peripheries are spaced along the axis of the roller relative to the concentric peripheries to contact the workpieces rearwardly (in the direction of movement of the workpieces across the rollers) of the centers of gravity of the workpieces.

4. Apparatus for conveying workpieces to be heated, such as elongated squares, restangles, hexagonals, and the like, through a furnace, comprising two series of racks extending parallel to but spaced from each other across the furnace and in the direction of movement of the workpieces through the furnace, at least one of said series of racks being movable vertically and horizontally relative to the other series, a plurality of teeth along the workpiece supporting surfaces of both series of racks, the sides of each tooth being straight and sloping towards the sides of the adjacent teeth to form triangular-shaped troughs between teeth, the sides of the teeth in one series of racks forming with each other an angle greater than 90°, the sides of the teeth in the other series of racks forming with each other an angle of at least 90°, and means for moving at least one series of racks relative to the other series whereby workpieces are moved alternately from one series to the other through the furnace.

5. Apparatus for conveying workpieces as described in claim 4, in which one series of racks is stationary and the other series is movable and in which the sides of each tooth in the movable racks are straight, slope towards the sides of the adjacent teeth and form therewith angles of at least 90° and in which the sides of each tooth in the stationary racks are straight, slope towards the sides of the adjacent teeth and form therewith angles of greater than 90°.

6. Apparatus for conveying workpieces as described in claim 4, in which the horizontal movement of the racks relative to each other is less than the pitch of the teeth.

7. Apparatus for conveying workpieces as described in claim 4, in which one series of racks is stationary and the other series is movable and in which the amount of horizontal movement of the movable racks is less than the pitch of the teeth in either series of racks, the teeth in the movable series of racks also being truncated to decrease the height of said teeth.

8. Apparatus as described in claim 4, in which the two series of racks are so spaced relative to each other in the line of movement of the workpieces and in which the amount of horizontal movement relative to each other is such that when workpieces are transferred from one series of racks to the other the initial point of contact between the workpieces and the series of racks to which the workpieces are to be transferred is rearwardly (in the direction of movement of the workpieces across the rack) of the centers of gravity of the workpieces.

9. Apparatus for conveying solid, elongated workpieces having cross-sectional shapes such as square, rectangular, hexagonal, and the like through a furnace wherein the workpieces are heated, comprising rollers spaced parallel to and from each other in the path of travel of the workpieces, the axes of said rollers extending transversely to the path of the workpieces on the rollers, said rollers having adjoining segments spaced along the axes of the rollers, each segment being eccentric to the axis of the rollers, the eccentric portions of each segment having sloping sides to form cam surfaces on the rollers for rotating the workpieces as they move across the rollers, adjoining segments having their points of greater eccentricity spaced 180° from each other about the axes of the rollers, two series of racks extending parallel to the axes of the rollers for receiving workpieces from the rollers, one of said series of racks being movable vertically and horizontally relative to the other whereby the workpieces are supported alternately by each series of racks and moved transversely to their axes across the racks and rotated about their axes during said movement, means for receiving the workpieces from the ends of the racks and withdrawing them axially from the furnace.

References Cited in the file of this patent

UNITED STATES PATENTS

| | | |
|---|---|---|
| 1,834,304 | Frank et al. | Dec. 1, 1934 |
| 2,650,694 | Findlater | Sept. 1, 1953 |
| 2,858,122 | MacGregor | Oct. 28, 1958 |

FOREIGN PATENTS

| | | |
|---|---|---|
| 561,487 | France | Oct. 23, 1923 |

UNITED STATES PATENT OFFICE
CERTIFICATE OF CORRECTION

Patent No. 2,983,498                                      May 9, 1961

Charles MacGregor

It is hereby certified that error appears in the above numbered patent requiring correction and that the said Letters Patent should read as corrected below.

Column 1, line 43, for "construciton" read -- construction --; line 49, for "paplication" read -- application --; column 5, line 72, for "restangles" read -- rectangles --; column 6, line 41, for "in", first occurrence, read -- is --; line 56, for "greater" read -- greatest --.

Signed and sealed this 24th day of October 1961.

(SEAL)
Attest:

ERNEST W. SWIDER
Attesting Officer

DAVID L. LADD
Commissioner of Patents
USCOMM-DC